United States Patent [19]

Sodi

[11] Patent Number: 4,902,889

[45] Date of Patent: Feb. 20, 1990

[54] OPTICAL SIGHT SYSTEM FOR THE DETECTION AND RECORDING OF INFRINGEMENTS OF THE ROAD TRAFFIC REGULATIONS, USING A LASER

[76] Inventor: Fiorello Sodi, Via Ugo Foscolo No. 5, 50018 Scandicci, Firenze, Italy

[21] Appl. No.: 231,182

[22] Filed: Aug. 11, 1988

[30] Foreign Application Priority Data

Aug. 25, 1987 [IT] Italy ................... 9466 A/87

[51] Int. Cl.[4] ............... G01V 9/04; G06M 7/00; G08G 1/01
[52] U.S. Cl. .................... 250/222.1; 250/221; 324/175; 340/936; 340/937
[58] Field of Search ............... 250/560, 222.1; 356/28; 324/175; 364/409, 562, 565; 340/936, 937, 942

[56] References Cited

U.S. PATENT DOCUMENTS

| | | | |
|---|---|---|---|
| 2,402,464 | 6/1946 | Suter | 340/936 |
| 2,927,836 | 3/1960 | Shore | 340/937 |
| 3,079,553 | 2/1963 | Brown, Jr. et al. | 340/936 |
| 3,222,682 | 12/1965 | Scott | 340/937 |
| 4,173,010 | 10/1979 | Hoffmann | 340/936 |
| 4,214,265 | 7/1980 | Olesen | 340/937 |
| 4,247,768 | 1/1981 | Elmer et al. | 250/222.1 |
| 4,272,189 | 6/1981 | Bailey et al. | 356/28 |
| 4,433,325 | 2/1984 | Tanaka et al. | 250/222.1 |
| 4,752,764 | 6/1988 | Peterson et al. | 340/937 |

FOREIGN PATENT DOCUMENTS 2523341 9/1983 France .................. 340/942

Primary Examiner—David C. Nelms
Assistant Examiner—Michael Messinger
Attorney, Agent, or Firm—McGlew & Tuttle

[57] ABSTRACT

Three sights are formed by a laser emitter system (10) and receiver system (5). The systems are disposed so as to be coaxial, the receiver system includes a photodiode receiver (5) which is associated with means for the amplification and electronic processing (7) of a signal, the signal consisting of sudden variations of the reflection of the emitter beam. A circuit arrangement (20) is provided for supplying the laser emitters for the emission of laser signals of a duration which is relatively short in comparison with the interval between two successive emissions.

16 Claims, 3 Drawing Sheets

OPTICAL SIGHT SYSTEM FOR THE DETECTION AND RECORDING OF INFRINGEMENTS OF THE ROAD TRAFFIC REGULATIONS, USING A LASER

FIELD AND BACKGROUND OF THE INVENTION

The invention relates to a system of high efficiency, of high precision and of particular practicality of use, for the detection of traffic violations on a road. The system also provides for recording of the traffic infringement for the purposes of the identification of the transgressor.

SUMMARY AND OBJECTS OF THE INVENTION

The system is of the type of those which provide for the use of sights of the optical type which can be intercepted, by at least one photographic camera and which includes data processing means.

According to the invention, the system comprises a sight with a complex of a laser emitter and photodiode receiver which are disposed so as to be coaxial. The photodiode receiver is associated with means for amplification and electronic processing of a signal consisting of sudden variation of the capacities to reflect the emitted beam.

Advantageously, a supply circuit for the laser emitter is provided which causes the emission of a laser signal of a duration which is relatively short in comparison with an interval between two successive emissions. This provides for low absorptions of power and limited danger.

The laser emitter is associated with a tubular optical screen and with an optical concentrating and focusing assembly for the desired distance of reflection. The tubular optical screen is disposed within and coaxially with an optical concentrating system for the distribution over the surface on a receiving photodiode with sufficient uniformity.

The receiving photodiode is accommodated in a metallic screening, in the present case ferrous, for protection from external disturbances, including those generated by rising and falling fronts of the power supply of the emitter etc.

For the amplification and the electronic processing, there may be provided: a preamplifier assembly with low noise and with gain control; an amplifier; a signal detector; a differential amplifier which receives the signal and the background noise; an assembly for controlling the gain on the average signal; as well as a trigger to generate a signal by comparison with a reference and timing value.

For a response which is reliable and free from errors, the system may comprise: three successive sights; means for processing the signals of the three sights in order to obtain transit time values, signal duration values and speed values; means of comparison between similar values detected on two different paths of sights, with elimination of the values which are not in agreement; and means of comparison with predetermined values, at least relating to the limiting speeds.

There may be provided means for imputting two different predetermined values, pertinent to speed limits for long vehicles and for motor cars, and switching means to carry out the comparison of the data detected with one or with the other of the predetermined values, depending upon the type of vehicle which has given rise to the detection; these switching means are controlled by values of length of the vehicle, which are obtained from the speed values and from the values of the duration of the signal representing interception of at least one of the sights on the part of a vehicle. These values may also be subjected to a monitoring of uniformity of the data detected by two different sights and pairs of sights.

The system may comprise furthermore and in combination: a photographic camera capable of photographing from behind a vehicle which has passed beyond the sights; a means for authorizing the photographic exposure, which means is subjected to the outcome of the comparison between the speed value acquired and the speed value predetermined and preselected as a function of the computed length of the vehicle; and a control means for delayed actuation of the photographic camera. The delay means receives and processes the data concerning speed and concerning length of the vehicle in transit, in order to obtain the photographic exposure at a predetermined and desired position reached by the tail of the vehicle with respect to the photographic camera. The photographic camera may be installed on a motor car and may be usable also for detections which can be carried out by pursuit.

In one possible embodiment, the system is disposed on board a motor car, with the three sights spaced on a structure extending longitudinally on the motor car, in this case on the roof of the driver's compartment. The structure with the sights may also be installed on the ground.

The system may also be associated with a photographic camera which is supplementary and/or alternative to the preceding one, to be disposed downstream of the sights to photograph a vehicle beforehand. In this case, means for processing the data concerning speed and concerning the instant of initiation of interception of a sight are provided to control, by radio, the actuation of the abovementioned photographic camera at the time when the front of the motor vehicle arrives at a predetermined distance from the camera, and on authorization of a data item concerning established infringement.

The system may comprise a monitor to receive information for a remote operator.

A radio transmission for the remote supply of the data to the monitor and/or to the photographic camera downstream of the sights may be implemented using means to avoid any error due to the transmission. In particular, there may be provided—associated with the monitor and/or with the said photographic camera located remotely—a central processing unit for comparing the data transmitted repeatedly and to give the authorization to supply the data to the monitor and/or to the photographic camera only in the event of coincidence of a plurality of receptions received in succession.

The system may be equipped with one or more safety devices for persons in relation to the laser emissions. A safety device may comprise radar means—or the like—to estimate the arrival of fast vehicles, and to activate the laser emission only in the case of an assumed infringement in progress. Another safety device may comprise an ultrasonic emitter—or equivalent device capable of interrupting the laser emission in the presence of obstacles (persons) in the zone in front of the emitter. A similar safety device may comprise means controlled by a power threshold of the laser reception signal, to interrupt the emission in the presence of very close reflective obstacles and thus of reception of signals above the specified threshold value.

The system may be equipped with polarizing filters to exclude or to attenuate extraneous lights, specifically due to reflection of natural light, and/or infrared (or the like) filters for the selection of the emission of the flash.

BRIEF DESCRIPTION OF THE DRAWINGS

The invention will be better understood on following the description and the accompanying drawing, which shows a nonlimiting practical example of the said invention. In the drawing:

FIGS. 3A and 3B show, in elevation, two possible conditions of operation; and

DESCRIPTION OF THE PREFERRED EMBODIMENT

Figure 1:
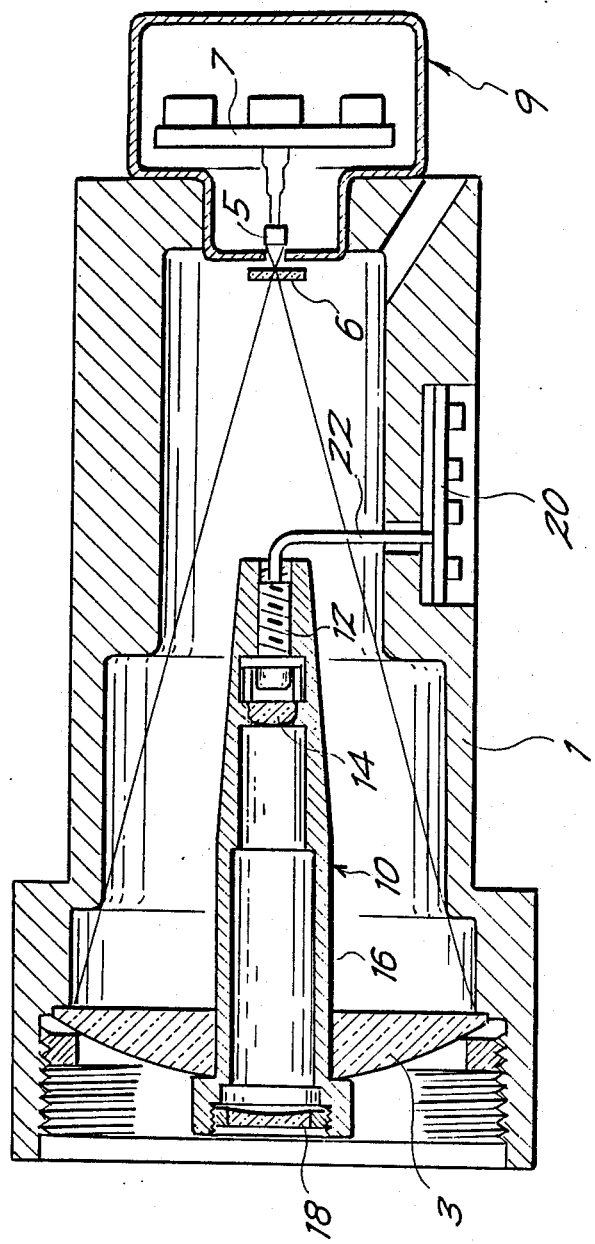
FIG. 1 shows a diagrammatic sectional view of a laser emitter and receiver.

According to what is illustrated in FIG. 1, a laser emitter and receiver according to the invention—for the formation of a sight—comprises a case 1, within which there is arranged an optical receiving system, of which a lens or optical system is indicated by 3, which lens 3 may be the only one or a lens of a multiple system. The lens 3 is provided to concentrate a beam of returning rays on the surface of a laser receiver such as a photodiode indicated by 5. The condensing and focusing system diagrammatically represented by the optical system 3 permits a substantially uniform illumination of the sensitive surface of the photodiode 5. In front of the photodiode 5 there may be disposed a filter 6 capable of excluding the arrival of ambient light at the photodiode. The photodiode 5 and a preamplifier circuit 7 associated with the latter are accommodated within a screen 9 of iron or of another material capable of ensuring the electrical and magnetic protection of protect the receiving system from disturbances due to the supply conductor of the emitter and from external disturbances of an other type. A laser emitter generally indicated by 10 is accommodated within the optical system substantively designated by the lens 3. 12 indicates a generator of a laser beam, with which there is associated an optical concentrator 14 and subsequently an optical screen for protection of the external face of the assembly 16. A focusing lens 18 operates together with the optical system 14 to produce a focusing at an appropriate distance for the use of the apparatus, generally approximately 10–15 meters, in order to be able to monitor a transit route intended for vehicles. An electronic supply circuit 20 is provided for powering the laser. The electronic supply circuit 20 is connected to the generator 12 via a conductor 22, which—also being screened—may generate disturbances from which the receiving photodiode is protected by means of the screen 9.

The emitter 12 is supplied with pulsed emissions of short duration and spaced by prolonged phases of interruption, in all cases with an operating frequency range exceeding 5000 Hz (for the applications concerned with monitoring traffic). The pulsed emissions provide a strong limitation in the energy absorbed and thus in the consumption levels, while the danger to humans is limited in this way; the high frequency ensures a high level of precision.

The optical systems of the emitter and of the receiver are constructed, by a spherical aberration and/or by other suitable expedients, in such a way as to obtain a desired focusing and in particular an adequate distribution on the surface of the photodiode 5 (of silicon or another material) in such a way as to obtain the excitation of the photodiode without concentrated saturations of the said photodiode. With a receiver as indicated by 5, 7 in FIG. 1 there is associated a detecting and comparing circuit which is illustrated particularly in FIG. 4. The laser sight is constructed in order to obtain a signal whenever a relatively very sudden variation of a signal received from the photodiode is determined, as a consequence of a variation of the capacity of reflection of a reflecting surface which is encountered by the beam of laser rays which is emitted by the emitter. Thus, an optical laser sight constructed according to the invention can be installed at any position on the road in order to strike any fixed target, from which the returning beam is reflected and reaches the photodiode 5, and thus the detection system according to FIG. 4 with a signal having a value which remains constant or changes slowly. Any interception due to a vehicle in transit necessarily causes a very sudden variation of the return signal, representing an increase or representing a decrease in comparison with the return signal received from the fixed target against which the sight is aimed; any sudden variation is processed by an electronic circuit (such as that of FIG. 4 or equivalent) in order to obtain a signal representing the detection of the transit of the vehicle, which presents a different reflection capacity and causes a sudden variation of the reflection signal received and thus a signal to control the computing system which is described below. The transit of a vehicle changes the value of the quantity of returning laser light; the passage of the front part of the vehicle causes a change which leads to the generation of a signal, which is utilized for the required computations. During the transit and the interception, continuous conditions of disturbance are maintained, which cease on termination of the transit of the vehicle and thus at the end of the interception. The return from the conditions of disturbance to the preceding quiet conditions (passage of the rear end of the vehicle) permits the generation of a second vehicle end signal, this signal also being utilized for the required computations.

Figure 4:
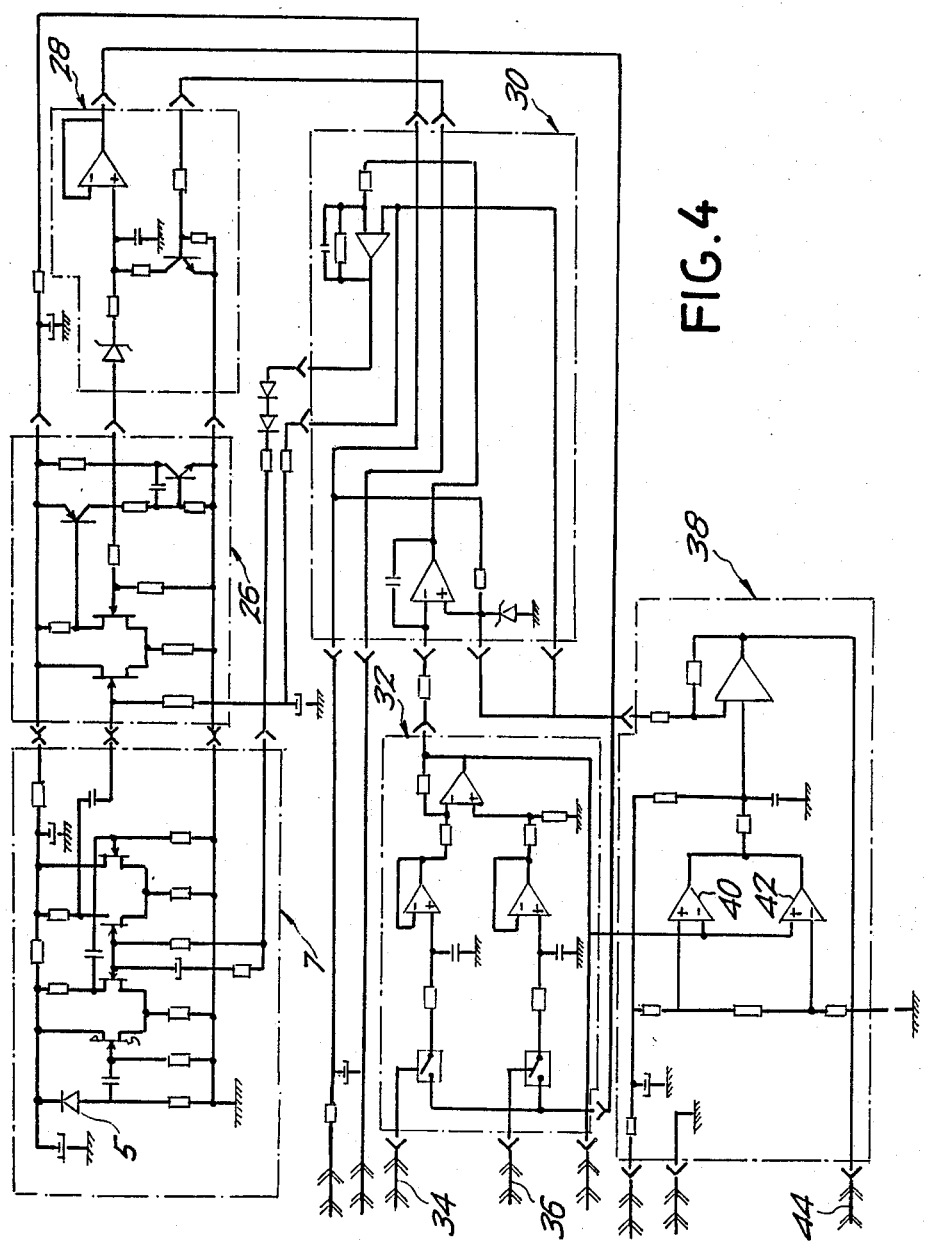
FIG. 4 shows an electronic circuit diagram of the system.

In FIG. 4, the photodiode 5 is illustrated combined with a preamplifier 7 of the low-noise type and with gain control; this preamplifier 7 is that which is advantageously contained within the screen 9 (FIG. 1). With the preamplifier 7 there is associated an amplifier 26, followed by a signal detector 28. With the signal detector 28 there are associated a gain control system, indicated by the block 30, and a differential amplifier system 32 for the elimination of the background noise which is received from the line 34, while the detected signal is input via the line 36. 38 indicates a block which comprises the triggers 40, 42, capable of generating on the output 44 a signal which is obtained by the comparison of the received signal with a reference value, while the output signal is obtainable with a system of evaluation of the time required for the return of the quiet condition.

The described system for constructing a sight proves to be particularly convenient as regards installation, there being no necessity for a specific aiming, it proves to be accurate because it is readily cleared of any form of external disturbance due to variations which are not particularly sudden, and it permits the generation of the signal both at the initiation and at the termination of an interception on the part of a vehicle in transit.

The sight constructed in this way is applicable to a particularly sophisticated monitoring system, which is described here and below and which requires—for a reliable identification of the vehicle and of the traffic infringement—the use of three successive sights disposed at a predetermined distance.

Figures 2, 3:
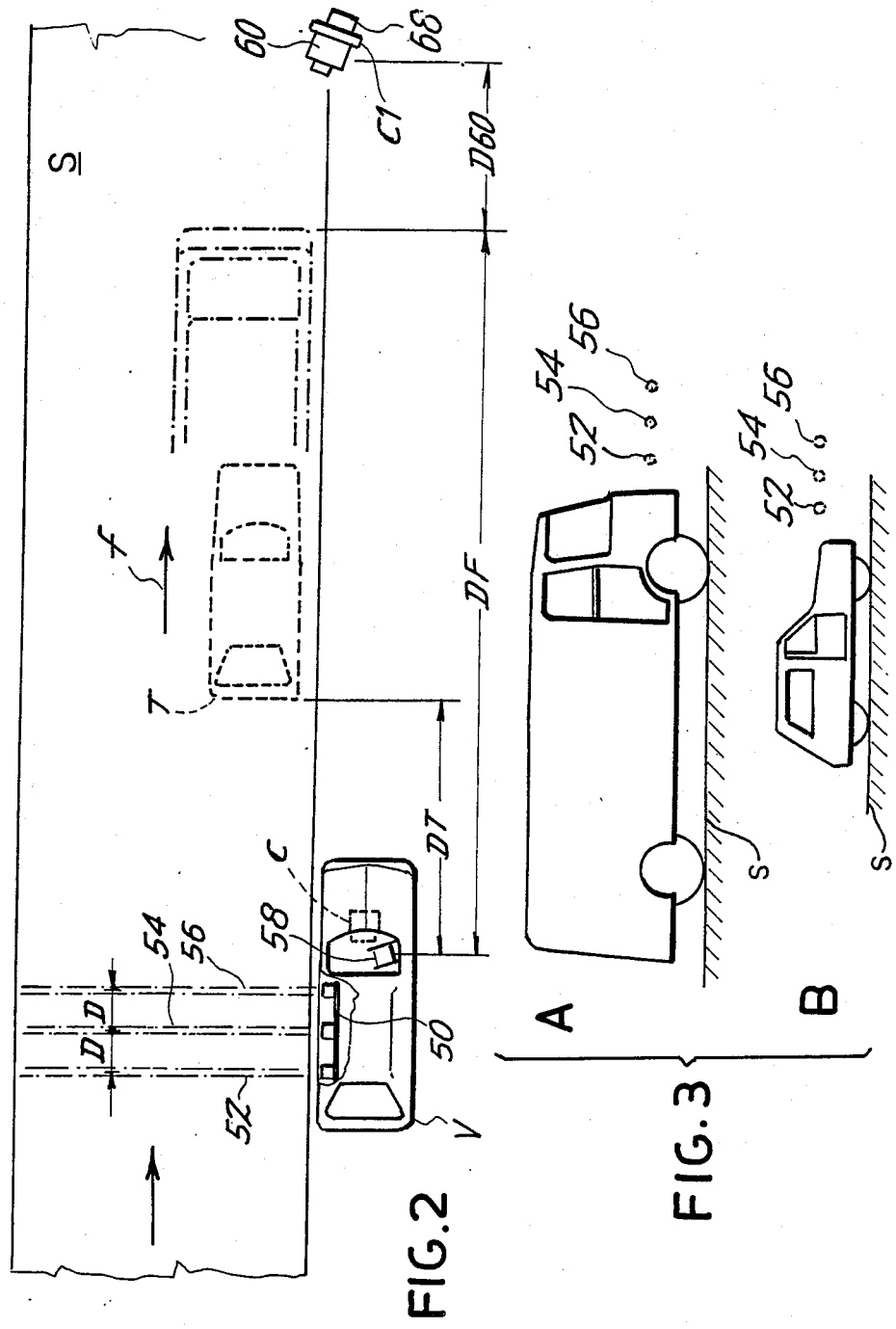
FIG. 2 shows a diagrammatic plan view of a moving installation.

With particular reference to FIG. 2 and also to FIG. 3, S indicates a road, i.e. a transit route to be monitored. A vehicle V equipped with the system in question may exhibit, on the roof, a longitudinal structure 50 which extends over a length, for example, of the order of 1 meter or of 1.50 meters and which exhibits three mutually parallel sights, generating the beams 52, 54 and 56 disposed at the distance D from one another. Alternatively, a structure such as 50 may be disposed also on the ground, on an adequate support. The vehicle will also be equipped with the assembly C for the computerization of the data received and for the processing of the computation of the same, and will advantageously also be equipped with a photographic camera 58, installed directly on the vehicle and which may also be the same photographic camera which is utilized in the monitorings and in the recordings of the infringements obtained during movement, i.e. while pursuing the user who is committing the infringement, with arrangements known per se. The camera 58 will also be equipped with means for printing on the photographs the various data which are required (monitoring position, data, time etc.). The diagrams of FIGS. 2 and 3 show the sights 52, 54 and 56, showing them by the laser emission beam provided for each emitter. In the diagram of FIG. 2, other characteristic dimensional data which are shown are a distance DT at which the photographic camera 58 can photograph in a focused manner the rear T of a vehicle in transit according to the arrow f, a distance DF between the vehicle V and a position in which the front F of a vehicle in transit can be photographed by a further photographic camera 60, which can be placed at a distance D60 from the position indicated by F for good focusing of the photograph which may be taken by the camera 60 oriented in the direction opposite to the direction of advance of the vehicle to be photographed. The camera 60 will have to be placed at the distance D60+DF from the vehicle V while all the other elements of the system may be mounted on board the vehicle. It follows from this that, apart from the systematic arrangement—which is moreover not essential—of the camera 60, the installation of the moving monitoring point is extremely simple and rapid; the camera 60 may be required when it is necessary to obtain a photograph of the front F of the vehicle in order to identify the driver of the vehicle. The camera 60 may also be provided as an alternative to the camera 58, in which case it is possible to photograph the front number plates which are of the same size as the rear ones or indeed of sufficient size.

A system for computation and for processing of the data, which is indicated by C in FIG. 2 by way of example and placed in a suitable manner on the vehicle V of the monitoring entity, may be in a position to receive the data concerning interception and the termination of interception—on the part of the vehicle—of each one of the three sights 52, 54 and 56 together with the instances of interception, the times between the interceptions of the successive sights at distance D from one another, and the times of successive termination of the interception of each one of the sights. It is thus clear that a processing system has available the spacial data consisting of the base D which separates one sight from the other, and the values DT, DF and D60 (specific to the system) and obtains the time of interception of two successive sights, by which it is possible to compute the speed of the vehicle. Two or more data concerning time and thus concerning speed may be obtained with the data received from the two pairs of sights 52, 54 and 54, 56, or, and better still, also between the two sights 52, 54, between the two sights 54,56 and with a data item which is even more reliable, between the sights 52, 56; in this last case, a double comparison is obtained. The system is equipped with means for comparison of the speed values obtained from the two computation systems, in such a manner as to eliminate those speed data which exhibit excessive disagreement between them on the occasion of the transit of a vehicle; the purpose of this criterion is to avoid any error in the signalling, when there is not a sufficient agreement of the data received from the two values computed on the two bases offered by the system. The system will also be equipped with means for comparison of the data item established concerning the speed with a limiting speed value, which permits the assessment of whether the vehicle has or has not exceeded the maximum speed specified on the system. Since, for the purposes of the speed limit, the vehicles can be of two types and, in particular, the motor cars of a limited length and the industrial vehicles of a greater length, a grading is provided between the value established for the speed of a vehicle in transit and the maximum speed threshold pertinent to the type of vehicle in transit. The type of vehicle in transit is selected by means of the assessment of the time which elapses between the initiation of the interception and the termination of the interception of a specified optical sight on the part of the vehicle; knowing the time between the initiation and the termination of the interception and being able to compute the speed of the vehicle, it is possible to compute the length of the said vehicle and thus, on the basis of the data item concerning length, to determine the grading between one or the other of the maximum speed thresholds pertinent to the type of vehicle in transit; the grading is effected on the basis of a limiting length, below which the higher speed limit value is considered and above which the lower speed limit value is considered. The monitoring of the length of the vehicle can also be affected on two of the sights, in order to obtain a possibility of monitoring and thus of exclusion in the event of uncertainty concerning the detection of the data item concerning length of the vehicle and thus concerning the type of vehicle and the limiting speed to be preselected for the comparison with the speed data detected.

The system is in a position to determine the existence of a traffic violation in the manner set forth above and, using this data, causing the control of the photographic exposure of the rear T of a vehicle which is committing the infringement. The control of the photographic camera 58, intended for photographing the rear T, is obtained in such a manner as to cause the photographic exposure to take place when the rear T is situated at the distance DT in order to obtain a good photographic exposure. The distance DT being known, the instant of the control of the photographic camera may be obtained easily, knowing the speed of the vehicle; thus, the processor can cause such control as a function of the established speed and of the instant of termination of interception on the part of the vehicle and thus of the position of transit of the rear T from one of the sights, which is the instant of initiation of computation of the time in which the distance DT is traversed.

When it is necessary to photograph the front F of a vehicle by using the camera 60, the distance DF being known and likewise the distance D60, the speed of transit of the vehicle being detected, it is possible to know the time after which the control of the camera 60 is determined, under conditions such as to take the exposure at the desired distance D60 of the front F from the camera 60, the instant of initiation of the counting being determined this time from the initiation of the interception made by the vehicle with its front F of one of the sights authorized for this monitoring.

The system may also be equipped with at least one monitor or other means for supplying the data to an operator, even remotely. A monitor may be utilized in combination, or by way of replacement for a photographic camera.

A transmission by radio in code is utilized for transmitting data and/or commands remotely, to a photographic camera (such as that shown at 60) and/or to a monitor for the operator. In order to avoid any error in the transmission, provision is advantageously made for sending the signals repeatedly and a central processing unit C1 is provided at the receiving assembly for the signals, which processing unit compares the data received repeatedly or redundantly and permits a situation in which the data transmitted (and processed) are demonstrated and/or made operative only subject to the condition that these have been received repeatedly and have been in perfect agreement among themselves; this excludes any possibility of error due to disturbances in the transmission. A same central processing unit C1 can be utilized to control the photographic camera 60 and/or a monitor 68.

In order to avoid disturbances generated, for example, by the flash combined with the photographic apparatus, it is possible to provide a suitable positioning of the photographic apparatus and a positioning of the sights and the placing of adequate screens, in order to prevent the generation of a disturbance due to the cat's eyes effect and to the beaded number plates of the motor vehicles. In particular, a positioning of the photographic cameras will be selected which is inclined with respect to the direction of the light of the incident flash on the beaded and reflective number plates, in such a manner that the reflection according to the characteristic lobe of the reflective surface is excluded from the camera. A screening outside the visible range—for example in the infrared—may be provided in order to emit with the flash and to receive on the photographic camera only the appropriately filtered light of the flash, attenuating the harmful effects of the flash on the driver and the disturbing effects of the headlights on the film.

An elimination of disturbances due to reflection of the sunlight may also be provided, with elimination of the reflections by means of a system of polarizing screens.

The system is advantageously equipped with security means against any possible damage which might be caused to persons by the laser emissions (which are, however, pulsed and of limited power).

A possible safety device may be implemented by means of a radar system which gives a warning of the arrival of a fast vehicle and thus causes the activation of the laser emissions for a time sufficient for the detections and for the processings and various commands.

Another possible safety device may be implemented by means of an emitter—whether ultrasonic or otherwise—which interrupts the laser emission in the presence of obstacles in the zone in front of the laser emitter.

Yet another possible safety device may be represented by a system for disabling the emissions in the event of reception of return signals of a level greater than a certain threshold, which is due to reflection by obstacles which are too close to the emitter.

Two or more safety devices may be adopted for a combined operation, rather than on an alternative basis.

It is understood that the drawing shows only an exemplification given only by way of practical demonstration of the invention, it being possible for this invention to vary in its forms and arrangements without thereby departing from the scope of the concept which forms the invention itself.

I claim:

1. The traffic violation detection and recordation arrangement, comprising:
    a plurality of optical sights, each optical sight including a laser emitter having a central axis and a photodiode receiver having a central axis, said laser emitter and photodiode receiver being arranged co-axially, said photodiode receiver including a photodiode sensing changes in light reflected from objects passing in front of a path of each associated laser emitter, and emitting a photodiode signal representative of the change in light sensed;
    power supply means including a power supply circuit associated with each laser emitter for generating a high frequency pulse laser emission, each emission having an emission duration which is much smaller than the duration between emissions;
    a tubular optical screen, connected to said laser, an optical concentrating and focusing assembly being connected to said tubular optical screen;
    photodiode optical concentrating means, arranged coaxial with said tubular optical screen, for concentrating and uniformly distributing incoming light on the photodiode;
    metallic screening means encompassing said photodiode, said screening means including an opening for receiving concentrated, distributed incoming light which has passed through said photodiode optical concentrating means, said screening means for shielding said photodiode receiver from external disturbances and disturbances generated by said power supply means and said laser emitter;
    photodiode signal amplification and processing means for amplifying said photodiode signal from an associated photodiode and processing said photodiode signal, including a preamplifier connected to said photodiode, a signal detector connected to said preamplifier, a differential amplifier for comparing the signal and a signal representative of background noise, gain control circuit means for controlling the gain on an average signal and trigger means for generating a signal by comparison with a reference and a timing value.

2. A system according to claim 1, wherein said plurality of sights includes three sights arranged successively; means for processing the signals of the three sights for obtaining a transit time value representative of the time it takes an object passing before the site to reach another sight, signal duration values representative of the duration of the change in reflected light and speed values, means for comparing one of time values, signal duration values and speed values detected on at least two different pairs of sights and means for eliminating values which are substantially not in agreement and means for comparison of one of said time values, signal duration values, and speed values with a predetermined stored value.

3. A system according to claim 2, further comprising comparison means for inputting one of two different predetermined values and comparing said one of two different predetermined values with said signal duration value and switching means for providing one of said two different values to said means for inputting two different predetermined values.

4. A system according to claim 3, including means for monitoring the differences between result obtained by said means for inputting two different predetermined values based on different sights.

5. A system according to claim 3, further comprising photographic camera means for photographing a vehicle which has passed beyond said sights; means for authorizing a photographic exposure by said photographic camera means, said means for authorizing a photographic exposure being connected to said means for inputting two different predetermined values and control means for delayed actuation of the photographic camera means, said control means receiving and processing said transit time values, signal duration values and speed values for obtaining a photographic exposure at a predetermined and desired position of the rear end of a vehicle with respect to the photographic camera means.

6. A system according to claim 5, wherein said photographic camera means is connected to a motor vehicle carrying the sights.

7. A system according to claim 1, wherein said three sights are connected to a motor vehicle via a longitudinally extending structure, each of the sights being spaced an equal distance along said structure.

8. A system according to claim 5, further comprising a supplementary photographic camera disposed at a location spaced from said sights, said supplementary camera being connected to processing means for controlling the actuation of said supplementary photographic camera such that the actuation coincides with a motor vehicle being situated at a predetermined distance from said camera, and for controlling the actuation of said supplementary photographic camera based on the comparison of transit time values, signal duration values and speed values with predetermined values.

9. A system according to claim 5, further comprising polarization filters for attenuation of extraneous light, said polarization filters being associated with said photographic camera means, said polarization filters excluding or attenuating extraneous light and/or infrared filters for the selection of emissions of light from a flash, said flash being disposed at an angle with respect to said photographic camera means.

10. A system according to claim 5, further comprising a monitor for receiving data, said monitor being positioned at a location remote from said sights.

11. A system according to claim 8, further comprising radio transmission means for remotely supplying data to one of a monitor and a photographic camera spaced from said sights, and central processing means for comparing first transmitted data with second transmitted data to determine a coincidence in said first and second data.

12. A system according to claim 2, wherein safety means is provided for restricting operation of said laser emissions to protect humans passing close to said sights.

13. A system according to claim 12, wherein said safety device includes radar means for sensing the approach of a vehicle to activate the emission of said laser emitter.

14. A system according to claim 12, wherein said safety device includes an ultrasonic emitter for interrupting laser emissions in the presence of humans in the zone in front of the emitter.

15. A system according to claim 12, wherein said safety device includes threshold power means for interrupting the emission of said laser emitter in the presence of reception of signals by said photodiode which are above a specified threshold value.

16. The traffic violation detection and recordation arrangement, comprising:
a plurality of optical sights, each optical sight including a laser emitter having a central axis and a photodiode receiver having a central axis, said laser emitter and photodiode receiver being arranged co-axially, said photodiode receiver including a photodiode sensing changes in light reflected from objects passing in front of a path of each associated laser emitter, and emitting a photodiode signal representative of the change in light sensed;
power supply means including a power supply circuit associated with each laser emitter for generating a high frequency pulse laser emission, each emission having an emission duration which is much smaller than the duration between emission;
tubular optical screen means for screening each laser emitter, connected to said laser,
an optical concentrating and focusing means for focusing and concentrating light reflected from objects passing in front of the path of each associated laser emitter assembly being connected to said tubular optical screen;
photodiode optical concentrating means, arranged coaxial with said tubular optical screen, for concentrating and uniformly distributing incoming light on the photodiode; and
a ferrous, metallic screening means encompassing said photodiode, said screening means including an opening for receiving concentrated, distributed incoming light which has passed through said photodiode optical concentrating means, said screening means for shielding said photodiode receiver from external disturbances and disturbances generated by said power supply means and said laser emitter.

* * * * *